(12) United States Patent
von Schweinichen

(10) Patent No.: US 6,793,008 B2
(45) Date of Patent: Sep. 21, 2004

(54) ROTATABLE ROLLER

(75) Inventor: Jaxa von Schweinichen, Netphen (DE)

(73) Assignee: Walzen Irle GmbH, Netphen (DE)

( * ) Notice: Subject to any disclaimer, the term of this patent is extended or adjusted under 35 U.S.C. 154(b) by 0 days.

(21) Appl. No.: 10/411,539

(22) Filed: Apr. 10, 2003

(65) Prior Publication Data
US 2003/0192673 A1 Oct. 16, 2003

Related U.S. Application Data

(62) Division of application No. 09/808,835, filed on Mar. 14, 2001, now abandoned.

(30) Foreign Application Priority Data

Mar. 14, 2000 (DE) .......................................... 100 12 062
Apr. 8, 2000 (DE) ......................................... 100 17 604

(51) Int. Cl.⁷ ................................................. F28F 5/02
(52) U.S. Cl. ........................ 165/89; 165/109.1; 492/46
(58) Field of Search .......................... 165/89, 90, 109.1; 492/46

(56) References Cited

U.S. PATENT DOCUMENTS

| | | | | |
|---|---|---|---|---|
| 3,625,280 A | * | 12/1971 | Peter ............................. | 165/90 |
| 3,834,205 A | * | 9/1974 | Maag et al. ................... | 72/201 |
| 4,235,002 A | * | 11/1980 | Pav et al. ...................... | 492/46 |
| 5,567,448 A | * | 10/1996 | Frankland .................... | 425/363 |
| 6,572,517 B1 | * | 6/2003 | Schimion ...................... | 492/46 |

* cited by examiner

Primary Examiner—Allen J Flanigan
(74) Attorney, Agent, or Firm—Friedrich Kueffner

(57) ABSTRACT

A rotatable roller has a roller body with channels for guiding a medium through the roller body for controlling the temperature of the roller body. At least one of the channels has a separating member separating the at least one channel into separate channel portions such that media having different properties are separately guided through the at least one channel. The separating member is helically shaped.

1 Claim, 4 Drawing Sheets

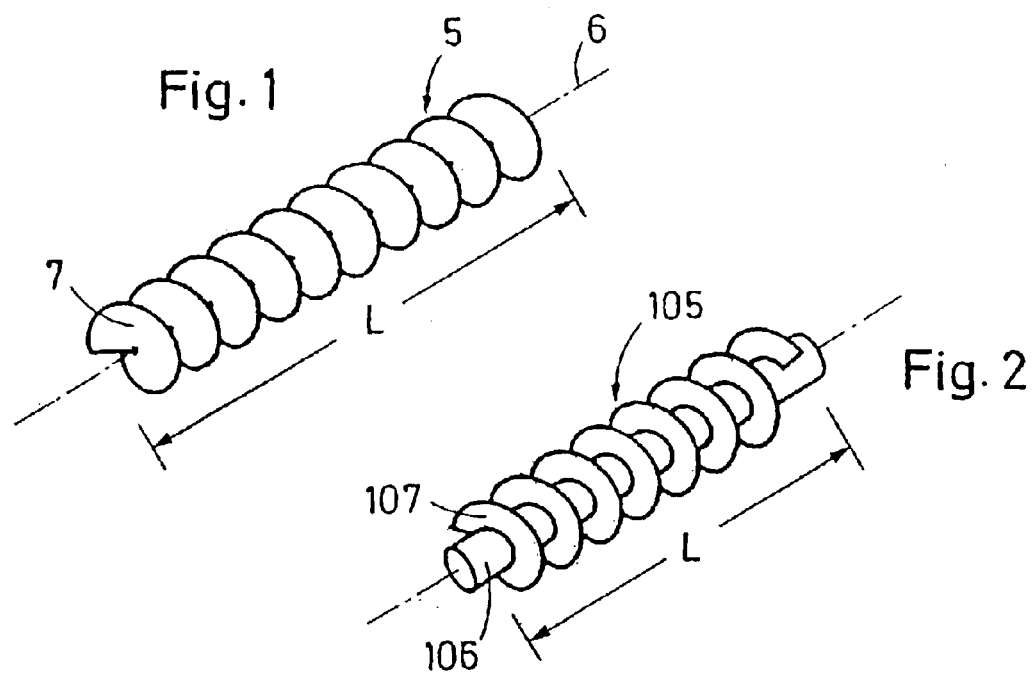
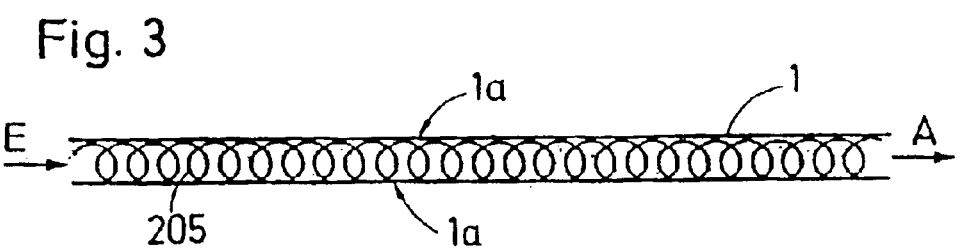
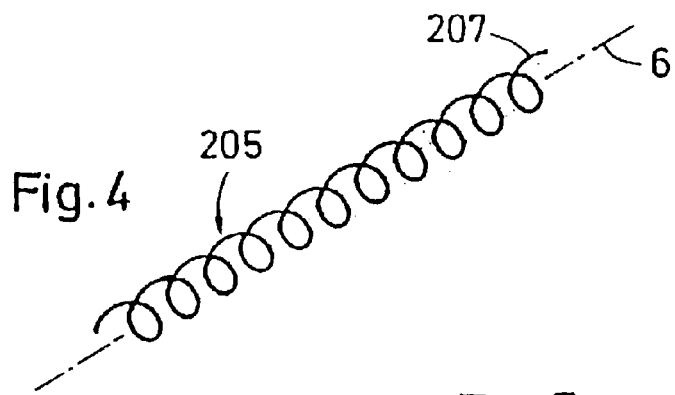
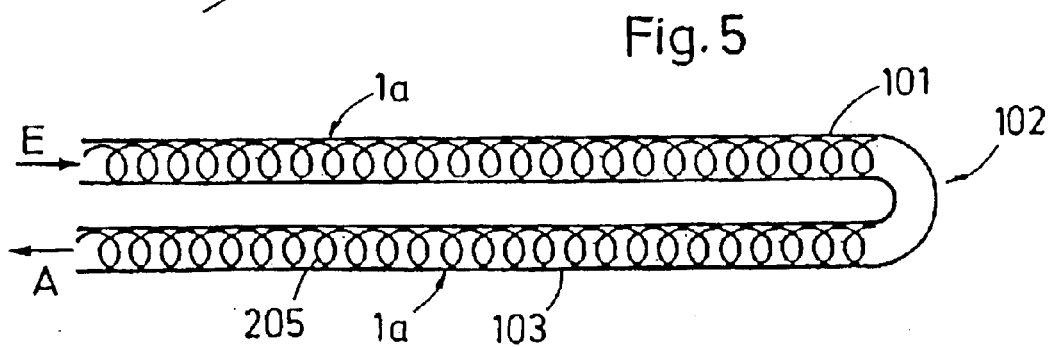

ROTATABLE ROLLER

This is a divisional application of U.S. patent application Ser. No. 09/808,835 filed Mar. 14, 2001, abandoned.

BACKGROUND OF THE INVENTION

1. Field of the Invention

The invention relates to a rotatable roller with a roller body, having correlated therewith channels for guiding a medium therethrough for the purpose of temperature control of the roller body, the medium being, in particular, a liquid.

2. Description of the Related Art

Such rollers are used in many fields of application, for example, in the manufacture of paper, in the foodstuff industry, as well as in rolling processes of plastic or steel, for example, for continuous casting and rolling in a continuous casting process. It is known in this context to provide roller bodies with channels, extending axially in the roller and near the surface, for temperature control of the roller bodies, for example, for heating them. Such rollers, for example, are disclosed in EP 0 606 660 A1.

In the case of channels with parallel walls, which can be produced by drilling, for guiding a medium through, in particular, a heating liquid, a high consumption of heating medium is required for a laminar flow in the channel. Moreover, only the outer areas of the flow profile provide sufficient heat to the walls of the channels and thus to the roller. Inwardly positioned flow threads largely keep their heat energy, and this impairs the heat transfer efficiency.

SUMMARY OF THE INVENTION

It is an object of the present invention to provide an improvement of the channels for such rotatable rollers.

In accordance with the present invention, this is achieved in that at least one of the channels has correlated therewith a separating member so that tempering media of different consistency and/or temperature and/or flow direction and/or flow speed can flow within one channel.

According to another embodiment this object is achieved in that at least one deflecting member correlated with at least one area of the channel and acting on the medium is provided which imparts an additional flow direction to the substantially axially oriented flow of the tempering medium.

The deflecting member for this purpose is characterized by at least one deflecting area which is positioned at a slant relative to the longitudinal axis of the deflecting member.

By providing separating members in the channels, the medium flow is provided with a smaller cross-section in the channel so that the speed of the tempering medium is increased and an improved temperature transfer is ensured. Moreover, the channel divided in this way can be used simultaneously for supplying and returning the tempering medium. In this context, a division of the channel into halves, thirds or fourths (two, three or four channel portions) is advantageous. Even divisions by greater numbers are possible. It is particularly advantageous when the separating member has the shape of a multi-start helix so that a turbulence of the tempering medium can be achieved simply by means of the helical configuration. Moreover, the residence time of the tempering medium is increased as a result of the longer travel path. The turbulence, the increase of the residence time, and the speed increase caused by the channel constriction result in an optimal heat transfer.

With the embodiment according to the invention of a roller having a deflecting member arranged in at least one area of the channels, which imparts to the substantially axially oriented tempering medium flow an additional flow direction, a departure from laminar flow of the medium flowing through the channels is ensured. Turbulence results with which the volume per time unit of the tempering medium flowing through the channel or channels of the roller is reduced. This results in savings of, for example, heating liquid. But at the same time, the heat transfer to the roller is improved; a larger proportion of the heating medium comes into contact with the walls of the channels.

When the deflecting member in its mounted position has a longitudinal extension following the channel orientation, the deflecting area can extend over a large longitudinal area of the channel. The heat transfer is then improved over a large longitudinal area of the channel. When arranging the deflecting area at least in the outer portion of the deflecting member, turbulence is achieved in the areas neighboring the channel walls. The efficiency is thus especially good. In this connection, the deflecting member can have a rigid longitudinal or form a deflection area as a whole, for example, in the way a coil spring.

An especially favorable configuration results when the deflecting area imparts a rotation to the medium flowing about the deflecting member. This can be achieved, for example, by a spiral shape of the deflecting member following the longitudinal direction of the longitudinal axis.

When the deflecting areas have varying ascending gradients across the axial extension of the deflecting member, the roller areas can be loaded in a targeted way with different intensity of the tempering media.

A special advantage results when the separating members and the deflecting members are inserted into one channel wherein the separating members can be the support for the deflecting members.

BRIEF DESCRIPTION OF THE DRAWING

In the drawing:

FIG. 1 shows a deflecting member which as a whole is of a screw shape;

FIG. 2 is a deflecting member similar to that of FIG. 1 in which a rigid central longitudinal axle is provided on whose exterior a screw is attached;

FIG. 3 is a straight heating channel which is formed, for example, as a bore in a roller body;

FIG. 4 is a deflecting member formed as a whole as a coil spring;

FIG. 5 is heating channel which has a 180° bend and which has inlet and outlet openings at the same side of the roller;

DESCRIPTION OF THE PREFERRED EMBODIMENTS

Figure 8:
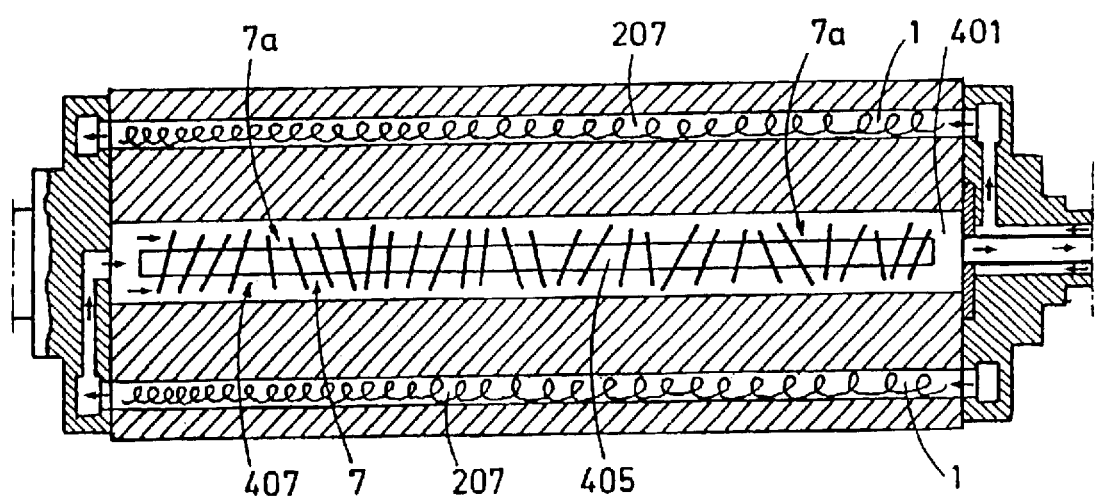
FIG. 8 is a schematic sectional view of a roller with a central hollow chamber used as a flow channel for the tempering medium, wherein a deflecting member is inserted into the hollow chamber.

The roller according to the invention (shown in FIG. 8) has one or more flow channels 1, 101, 201, 301, 501, 601 which are arranged axially in the roller and are distributed about the circumference of the roller and in which a medium, in particular, a liquid, is guided for temperature control (tempering) of the roller. Such channels can be produced, for example, by drilling and can then have a straight extension. Generally, several such channels are arranged in a roller. Such a roller body is provided on both ends with flange pins by which a connection of the channels to an outer supply with heating or cooling media is ensured. A central axial hollow space in the hollow roller (FIG. 8) can be used as a flow channel 401 for tempering media wherein this channel 401, for example, is a supply line and a peripheral channel 1, 101, 201, 301, 501, 601 can serve as a return line or vice versa. The central flow channel 401 can be provided with a deflection member 405 for an improved adjustment of the flow conditions, wherein the deflection member 405 with regard to its size is matched to the axial and radial extension of the hollow space or chamber.

FIG. 3 shows a straight channel 1 which has at one roller end an inlet E and at the other roller end an outlet A for the flowing medium.

In a further embodiment (FIG. 5) a channel 101 is illustrated whose inlet E and outlet A are positioned on the same side of the roller surrounding the channel. Opposite the inlet and outlet an axial end portion 102 is provided in which a 180° bend of the channel 101 is formed so that the return path 103 to the outlet side is provided.

Figure 6A:
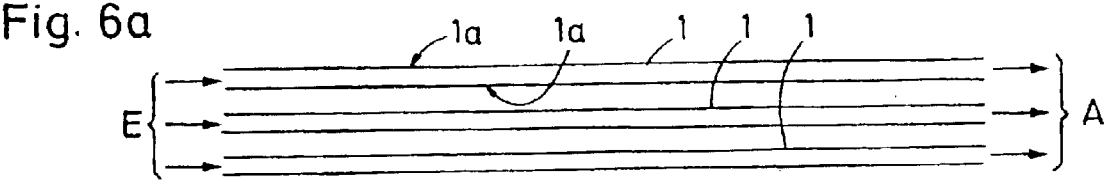
FIG. 6a is a parallel arrangement of several so-called single-pass channels.
Figure 6B:
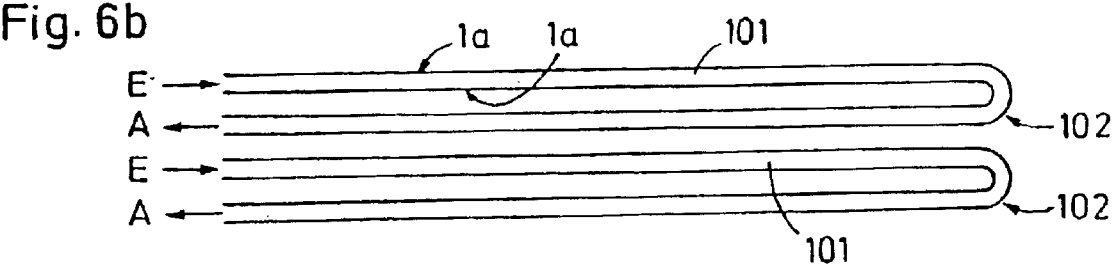
FIG. 6b shows a dual pass arrangement in which inlet and outlet openings are positioned on the same side of the roller.
Figure 6C:
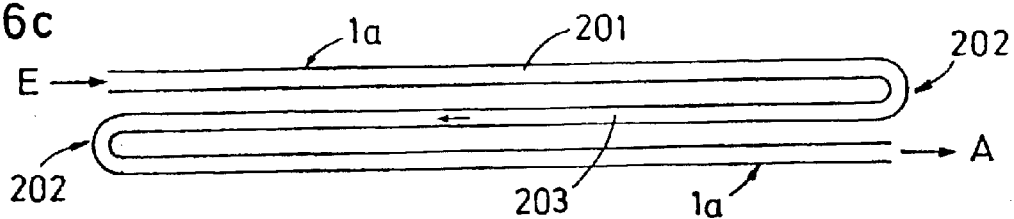
FIG. 6c shows a triple pass arrangement with two bends.
Figure 6D:
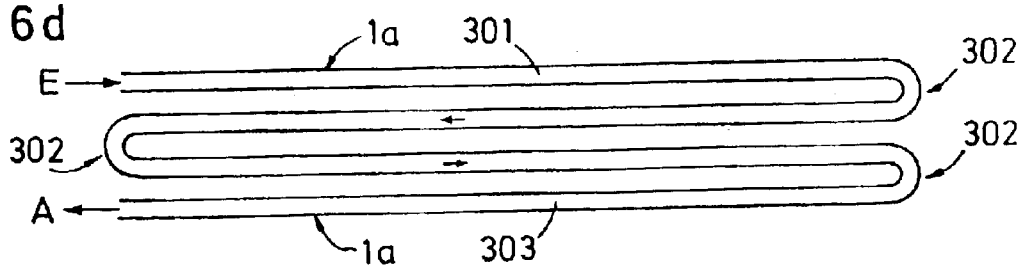
FIG. 6d shows a quadruple pass arrangement wherein the channel has three 180° bends.

According to the embodiment of FIG. 6c two deflections or bends 202 are formed so that the inlet side E and the outlet side A of the channel 201 are positioned on opposite sides of the roller. According to FIG. 6d three bends 302 are provided so that the inlet E and outlet A of such a channel 301 are again positioned on the same side of the roller body. All such channels 1, 101, 201, 301 penetrate preferably substantially or completely the roller body in the direction of its axial extension.

Figure 7A:
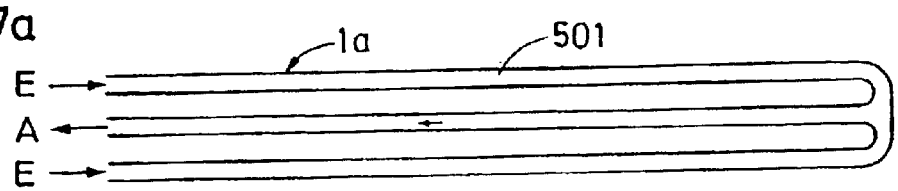
FIG. 7a is an arrangement in which two inlet openings communicate with one outlet opening.
Figure 7B:
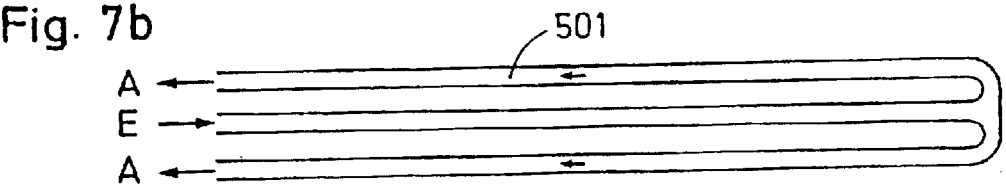
FIG. 7b is a reverse arrangement in which one inlet opening communicates with two outlet openings.
Figure 7C:
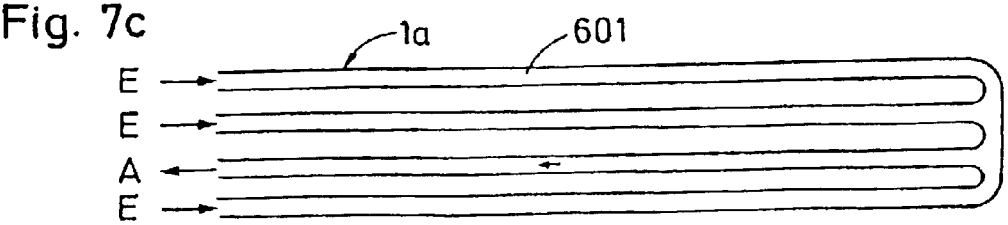
FIG. 7c is an arrangement in which three inlet openings communicate with one outlet opening.

The channel 501 is formed such that two externally positioned inlet lines E are guided to a central outlet line A. The number of inlet and outlet openings E, A is thus different. The same holds true for the channel system according to FIG. 7b in which the inlet and outlet openings have been switched. The channel 601 according to FIG. 7c has three inlet openings E and one outlet opening A so that here the number of inlet openings and outlet openings E, A is also different.

FIG. 1 shows a deflecting member 5 which has a longitudinal extension L parallel to its longitudinal axis 6. The deflecting member 5 comprises a deflecting area 7 which is formed as a screw guided about the longitudinal axis 6 and which is positioned at a slant relative the longitudinal axis 6. When mounted in a channel 1, 101, 201, 301, 501, 601, the deflecting areas 7 are positioned at an acute angle relative to the walls 1a of the channel 1, 101, 201, 301, 501, 601.

The deflecting member 5, 105 according to FIG. 2 comprises a rigid central axle 106 about which the slantedly positioned and coil-shaped deflecting areas 107 extend. The deflecting areas can be formed continuously like a screw over the entire longitudinal extension L of the deflecting member 105, or individual slantedly positioned deflecting areas 107 can be provided.

According to a third embodiment the deflecting member 205 is formed as a whole as a coil spring body so that the longitudinal axis 6 is only surrounded by the deflecting areas 207.

The FIGS. 3 and 5 show a deflecting member 205 for use in a channel 1 or 101 which is arranged in a roller body of a roller, for example, in the form of a hollow cylindrical roller, that is to be temperature-controlled (tempered). As described above, such channels 1, 101 as well as the channels of the further embodiments are positioned closely underneath the outer roller surface in order to thus provide a heating process that is as efficient as possible.

All of the illustrated deflecting members 5, 105, 205, 405 create a turbulent flow in the heating medium so that the individual flowing particles must travel a longer distance within the channel 1, 101, 201, 301, 401, 501, 601 and the residence time and thus also the energy transfer time are increased. This effect is maintained also for a point-directed increased flow velocity of the particles of the medium as it can be caused by turbulences. Also, deflecting members 5, 105, 205, 405 are possible which have deflecting areas 7, 107, 207, 407 that are not shape-stable but are to be formed by the oncoming medium so that in this way a chaotic flow of the medium results. This can change upon a change of the temporal course or when changing the pressure of the medium as it is guided through.

When using a spring-like or other deformable deflecting member 205, the incline of the deflecting area 207 or the length L of the deflecting member can be varied, optionally during operation, in order to be able to affect the type of turbulences and the possibly additionally formed rotation and to thus be able to affect the parameters flow speed, liquid amount to be introduced, or gas amount, residence time, and turbulence of the introduced medium. Across the axial course of a deflecting member 5, 105, 205, 405 the incline of the deflecting areas 7, 107, 207, 407 can be varied so that areas 7a with minimal incline and areas 7b with large incline are present. Areas with identical or different incline 7a, 7b can be furthermore spatially spaced from one another.

Figure 9:
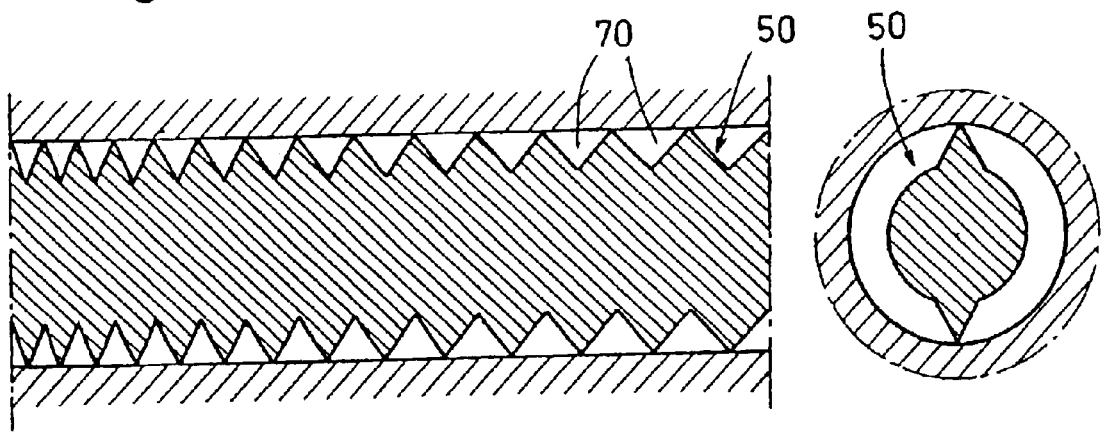
FIG. 9 shows a separating member in the form of a multi-start helix wherein the angle of inclination of the helix decreases continuously in the flow direction.

FIG. 9 shows a separating member 50 in the form of a two-start helix 70 that can be inserted into a channel. The incoming flow of the tempering medium can be guided within a channel portion formed by one of the helix strands and the return flow of the tempering medium can be guided in the other channel portion defined by the other helix strand. In this connection, the supply and return of the medium can be provided within a single channel. However, there is also the possibility that the supply of the tempering medium is realized in one coil of one channel and the return of this tempering medium in another coil of another channel. There is also the possibility to supply both helix strands of one channel with inflowing tempering medium wherein even different tempering media, i.e., of different inconsistency and/or temperature and/or speed, can be supplied.

FIG. 9 shows that the inclination angle of the helix strands, which are both used for supplying the tempering medium, is continuously reduced in the flow direction. This means that the travel path of the tempering medium is longer, the residence time is increased, and the speed must be correspondingly increased so that an improved heat transfer is possible.

Figure 10:
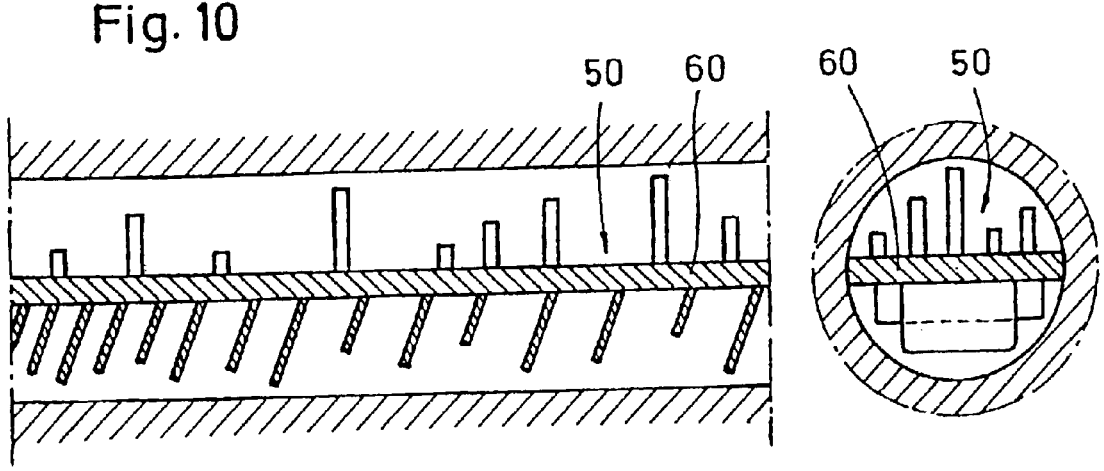
FIG. 10 shows a separating member which is provided with deflecting members.

FIG. 10 shows a separating body 50 which at the same time has deflecting members as a unitary part thereof. They are arranged within a partial area of the channel at any desired location. In the second partial area the deflecting members with a continuously changing incline are provided.

With a computer-controlled simulation, an optimization of such deflecting members and/or separating members can be achieved so that the heat transfer is maintained at a constant level substantially over the entire axial longitudinal extension of the roller body. With varying inclines 7a, 7b a point-oriented controlled heat transfer is also possible as an alternative.

The shown deflecting bodies 5, 105, 205, 405 as well as the separating members can also have any desired other configuration. They can be inserted by retrofitting into the channels 1, 101, 201, 301, 401, 501, 601. This facilitates mounting. Also, conventional rollers can be retrofitted in this way.

It is not mandatory that the deflecting areas 7, 107, 207, 407 impart rotation onto the medium, as has been explained in connection with the above embodiments. However, this makes it possible to introduce a uniform and predictable sequence of turbulent flows in the channel of the roller to be temperature-controlled (tempered).

The deflecting bodies 5, 105, 205, 405 and/or the separating members can be shaped, depending on the employed medium, of different materials, for example, stainless steel or plastic material, inasmuch as corrosive media are being used.

While specific embodiments of the invention have been shown and described in detail to illustrate the inventive principles, it will be understood that the invention may be embodied otherwise without departing from such principles.

What is claimed is:

1. A rotatable roller comprising a roller body having a periphery and an axis, the roller body having adjacent the periphery axially extending channels configured to guide a medium through the roller body for controlling the temperature of the roller body, wherein at least one of the channels has a helically shaped separating member separating the at least one channel into separate axially extending portions.

* * * * *